(12) United States Patent
Chen et al.

(10) Patent No.: US 8,569,392 B2
(45) Date of Patent: Oct. 29, 2013

(54) METHOD FOR MAKING ABSORBENT FOR METAL

(75) Inventors: Yen-Chung Chen, Taoyuan County (TW); Chih-kai Chang, Taoyuan County (TW); Hsiou-Jeng Shy, Taipei (TW); Ching-Yu Tso, Taoyuan County (TW); Jen-Bin Won, Taoyuan County (TW); Ming-Der Ger, Taoyuan County (TW)

(73) Assignee: Chung-Shan Institute of Science and Technology, Armaments Bureau, Ministry of National Defense, Taoyuan (TW)

( * ) Notice: Subject to any disclaimer, the term of this patent is extended or adjusted under 35 U.S.C. 154(b) by 132 days.

(21) Appl. No.: 13/232,924

(22) Filed: Sep. 14, 2011

(65) Prior Publication Data
US 2013/0066030 A1    Mar. 14, 2013

(51) Int. Cl.
*H05B 3/28* (2006.01)
(52) U.S. Cl.
USPC .......................................................... 522/1
(58) Field of Classification Search
USPC .......................................................... 522/1
See application file for complete search history.

(56) References Cited

U.S. PATENT DOCUMENTS

| 5,064,879 | A | * | 11/1991 | Shiga et al. | 523/310 |
| 5,115,036 | A | | 5/1992 | Shiga | |
| 5,328,935 | A | * | 7/1994 | Van Phan et al. | 521/64 |

OTHER PUBLICATIONS

Wiesbrock, Frank et al, Microwave-Assisted Polymer Synthesis: State-of-the-art and future perspectives, 2004, Wiley, Macromol. Rapid Commun. 25, 1739-1764.*
Cox, M. et al., Sorption of precious metals onto chemically prepared carbon from flax shive, Hydrometallurgy, vol. 78, Mar. 2, 2005, pp. 137-144.
Say, Ridvan et al., Preparation of poly(hydroxyethyl methacrylate-co-methacrylamidohistidine) beads and its design as a affinity adsorbent for Cu(II) removal from aqueous solutions, Colloids and Surfaces, A: Physicochemical and Engineering Aspects, vol. 196, Jan. 4, 2002, pp. 199-207.

* cited by examiner

*Primary Examiner* — Ling Choi
*Assistant Examiner* — Jessica E Whiteley
(74) *Attorney, Agent, or Firm* — Jackson IPG PLLC

(57) ABSTRACT

Disclosed is a method for making absorbent for metal. In the method, at first, solution of first monomer and solution of second monomer are provided. Then, the solution of the second monomer is introduced into the solution of the first monomer. Finally, a microwave reaction is executed to provide micro-alls of absorbent for metal.

12 Claims, 3 Drawing Sheets

METHOD FOR MAKING ABSORBENT FOR METAL

BACKGROUND OF INVENTION

1. Field of Invention

The present invention relates to metal and, more particularly, to a method for making absorbent for metal for use in absorbent, paint, emulsion resin, adhesive, polymeric concrete and textile paste.

2. Related Prior Art

A huge number of information products and consumer products are produced globally, with a lot of metal consumed. Hence, we are running out of reserves of metal. Moreover, such information products and consumer products are replaced with new ones rapidly so that their lives are shortened. Therefore, there is a huge amount of waste related to electronic devices that are disposed of. Such waste includes various sorts of fundamental metal and metal. There are various sources of wasted metal. The resources include mines, metallurgy, mechanical manufacturing, chemical industry, electronic industry and instruments.

Heavy metal is often toxic, acute or chronic. Sometimes, heavy metal poisons living creatures in a complicated manner to affect an entire food chain. As the study of the heavy metal and related measurement technology advance, there is a trend to process the heavy metal by higher standards. Some of the heavy metal is recycled while the other heavy metal is stabilized so that it does not impose hazard to the environment and the living creatures living in the environment.

In the past decades, synthetic macromolecular composite micro-balls have gained a lot of attention. For example, polymethylmethacrylate ("PMMA") macromolecular micro-balls made by polymerization of methylmethacrylate monomer ("MMA") are an important organic transparent material. PMMA is very transparent, stands various sorts of weather, exhibits balanced mechanical properties, and can easily be processed. However, PMMA does not stand heat and exhibits a low absorption rate, inadequate mechanical strength and lacks functional groups. By co-polymerization or surface modification, macromolecular micro-balls can be provided, on the surface, with various functional groups such as —COOH, —$NH_2$, —OH, —$SO_3H$ and —$CH_3Cl$. Thus, the macromolecular micro-balls can be provided with new functions. Hydrophile polymers provided with functional groups can easily be distributed on the surfaces of the micro-balls, thus the surfaces of the micro-balls are functionalized. Macromolecular micro-balls with the carboxylic group are suitable for various applications because the molecules of the carboxylic acid easily react with various molecules. Therefore, the macromolecular micro-balls provided with the carboxylic group gain a lot of attention. There have been various efforts to polymerize macromolecular micro-balls provided, on the surfaces, with the carboxylic group for absorbing proteins to become vaccines, adhering broken bones, processing potable water, and processing waste water. The use of the macromolecular micro-balls as absorbent is advantageously simple and inexpensive. However, the macromolecular micro-balls exhibit low absorption ratio and speed regarding metal, and only absorb a limited number of types of metal.

In 2005, Cox et al. studied the use of active carbon to absorb metal. Regarding the absorption rates, Au (III)>Pd (II)>Ag (I)>Pt (II)≈Pt (IV). The study has revealed that active carbon possess large specific area that is advantageous for absorbing metal. However, active carbon absorbs only a limited number of types of metal, and the reprocessing of active carbon is difficult.

In 2002, Say et al. used poly(HEMA-EGDMA) micro-balls and a chelating agent, 2-methacrylamidohistidine ("MAH"), for modification. The resultant product absorbs metal ions very well.

As disclosed in U.S. Pat. Nos. 5,115,036 and 5,064,879, co-polymer of ethylene with aminoalkyl acrylate includes functional groups that are electrically negative for chelating metal ions in waste water processing. It however takes a very long period of time (3 to 16 hours) to complete the reaction. Moreover, the metal ions must be removed after the reaction, and this is a big challenge for the cost of related equipment.

The present invention is therefore intended to obviate or at least alleviate the problems encountered in prior art.

SUMMARY OF INVENTION

It is the primary objective of the present invention to provide a method for making selective, efficient and economic absorbent for metal.

To achieve the foregoing objective, the method includes the steps of providing solution of first monomer and solution of second monomer, introducing the solution of the second monomer in the solution of the first monomer, and executing a microwave reaction to provide micro-alls of absorbent for metal.

The composition of the first monomer includes the first monomer and a solvent.

The composition of the second monomer includes the second monomer, initiator and cationic dispersant.

The first and second monomers are made of methylmethacrylate, phenylethene, vinyl acetate, acrylic acid, methacrylic acid, trifluoromethylacrylic acid, methylenesuccinic acid or vinylbenzoic acid. The first and second monomers may be made of a same compound. Alternatively, the first monomer may be made of methylmethacrylate while the second monomer may be made of acrylic acid.

The solvent is solution that contains a small amount of salt. The solution includes water and NaCl or $NH_4Cl$. The weight concentration of the salt in the water is 0.01% to 1%.

The initiator is azobisisobutyronitrile, lauroyl peroxide, ammonium persulfate or potassium persulphate.

The cationic dispersant is mixture of 2-(methacryloyloxy) methyl-trimethylammonium chloride, 2-(methacryloyloxy) ethyl-trimethylammonium chloride or 3-methacryloxy-propyl-trimethoxysilane with hydrochloric acid or sulfuric acid.

The cationic dispersant is mixture of methacryloyloxy-ethyl trimethyl ammonium chloride with methacrylatoethyl trimethyl ammonium chloride.

The microwave reaction is executed for 5 to 120 minutes, at 30 watts to 300 watts, at 60° C. to 85° C.

The step of executing the microwave reaction includes the step of providing a reactor with a cooling unit to ensure that microwave heating is executed in the entire period of the microwave reaction.

The step of executing the microwave reaction includes the step of executing a centrifugal process on the solution of the step of executing the microwave reaction, thus providing micro-balls, the step of filtering the micro-balls, the step of washing the micro-balls, and the step of drying the micro-balls.

The size of the first and second monomers is 3 to 7 micrometers.

Other objectives, advantages and features of the present invention will be apparent from the following description referring to the attached drawings.

BRIEF DESCRIPTION OF DRAWINGS

The present invention will be described via detailed illustration of two embodiments referring to the drawings wherein.

DETAILED DESCRIPTION OF EMBODIMENTS

Figure 1:
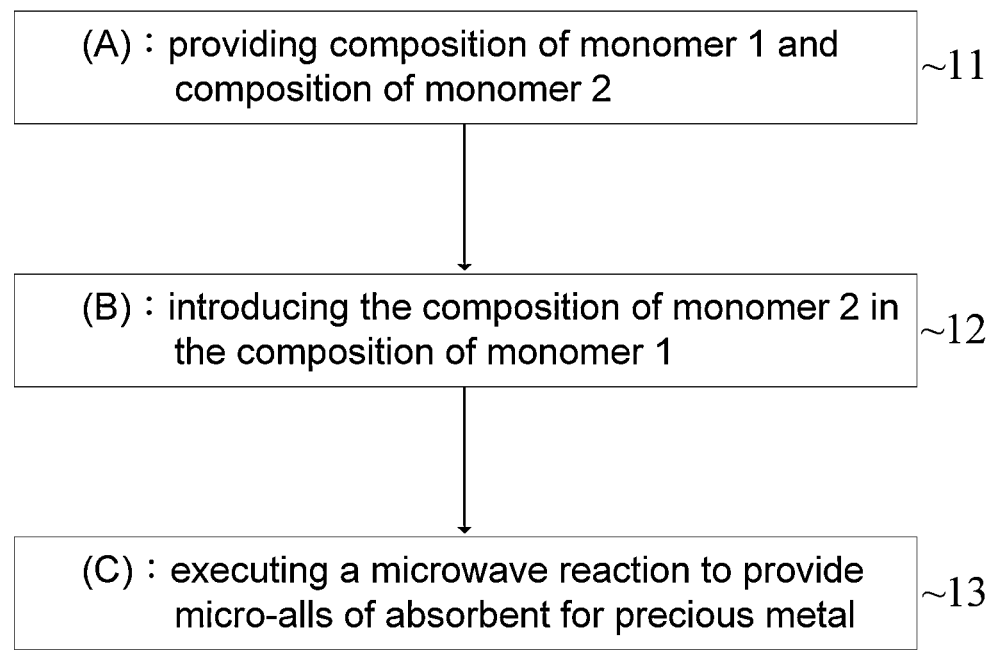
FIG. 1 is a flow chart of a method for making selective, efficient and economic absorbent for metal in accordance with the first embodiment of the present invention.

Referring to FIG. 1, there is a method for making selective, efficient and economic absorbent for metal in accordance with a first embodiment of the present invention. At 11, there is provided solution of monomer 1 and solution of monomer 2. The solution of monomer 1 includes monomer 1 and solvent. The solution of monomer 2 includes monomer 2, initiator and cationic dispersant ("MTC"). In the first embodiment, monomer 1 and monomer 2 may be methylmethacrylate, phenylethene, vinyl acetate, acrylic acid, methacrylic acid, trifluoromethylacrylic acid, methylenesuccinic acid or vinylbenzoic acid for example. Monomer 1 and monomer 2 may be a same compound.

At 12, the solution of monomer 2 is introduced into the solution of monomer 1 and the resultant solution is stirred. Monomer 2 is introduced into the solution of monomer 1 at a predetermined ratio and the resultant solution is evenly stirred.

At 13, a microwave reaction is conducted on the resultant solution to provide grains of absorbent for metal. Conditions of the microwave reaction includes reaction time of 5 to 120 minutes, power of 30 to 300 watts, and temperature of 60° C. to 85° C.

Figure 2:
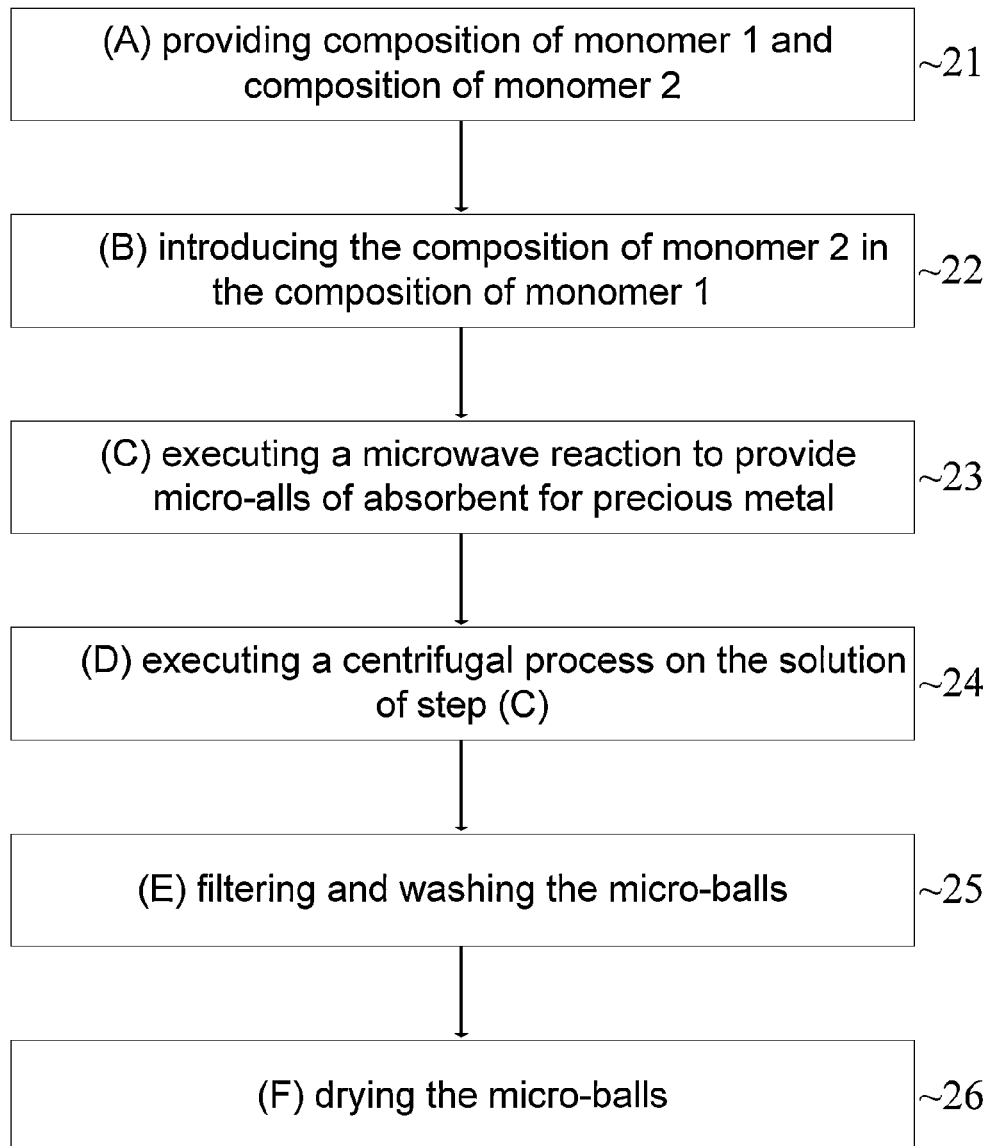
FIG. 2 is a flow chart of a method for making selective, efficient and economic absorbent for metal in accordance with the second embodiment of the present invention.

Referring to FIG. 2, there is a method for making selective, efficient and economic absorbent for metal in accordance with a second embodiment of the present invention. At 21, there is provided solution of monomer 1 and solution of monomer 2. At 22, the solution of monomer 2 is introduced into the solution of monomer 1 and the resultant solution is stirred. At 23, a microwave reaction is conducted on the resultant solution to provide grains of absorbent for metal. At 24, the resultant solution obtained at 23 is subjected to a centrifugal process. At 25, the grains of the absorbent are filtered and washed. At 26, the grains of the absorbent filtered at 25 are dried. The grains of the absorbent exhibit a large specific surface, high absorption speed, selective absorption and excellent liquidity.

Example 1

At first, 5 grams of methylmethacrylate ("MMA") monomer is mixed with 0.1 gram of initator such as azobisisobutyronitrile ("AlBN"), thus providing an organic phase. Medium composition includes 40 grams of methanol, 10 grams of pure water and 0.1 gram of cationic dispersant (MTC) introduced into medium. A predetermined amount of acrylic acid ("AA") is also introduced into the medium and stirred for 20 minutes, thus providing an even phase. The conditions and parameters of the microwave reaction include the use of a microwave reactor, Discover made by CEM. Before the microwave reaction, methylmethacrylate solution is crystal clear. The solution is poured into a 100 ml round-bottom flask and subjected to the microwave reaction in the microwave reactor. The reaction mode of the microwave reactor is set to be the standard mode. The power of the microwave reactor is 150 watts. The reaction temperature is 75° C. The amounts of AA in the samples are 0.1, 0.2, 0.3, 0.4 and 0.5 grams, respectively. Air cooling is executed by Power MAX. After the microwave reaction, the microwave reactor cools the reactants to 50° C. with the help of air pumped from an air pump. Thus, polymethylmethacrylate cross-linked acrylic acid dispersant solution is produced.

As shown in Table 1, with a micro-ball size analyzer, impacts on the size of the grains of polymethylmethacrylate cross-linked acrylic acid by different amounts of AA are studied. A small number of samples are measured with the micro-ball size analyzer and an SEM. Air cooling (Power MAX) may continuously be executed on the reactor by cooling air while microwave radiation is conducted. Conventionally, when the temperature of the microwave reactor reaches a set temperature, the power of the microwave reactor is tuned down or the microwave reactor is turned off. Hence, the microwave heating is replaced with conventional thermal chemical reaction. However, if air cooling is executed, i.e., pressurized air is continuously introduced to cool the reactants, it can be made sure that the microwave heating is always executed in the reaction. The microwave reaction time may be 5 to 120 minutes. The power of the microwave reactor may be 30 to 300 watts. The temperature of the microwave reaction may be 60° C. to 85° C.

In the microwave reaction, if 0.1 gram of AA is used, the average size of the micro-balls is 3.67 μm. If 0.5 gram of AA is used, the average size of the micro-balls is 6.01 μm. Compared with the polymerization without using AA, the polymerization with the use of AA considerably increases the size of the micro-balls.

TABLE 1

| Amount of AA | Size of Micro-balls |
| --- | --- |
| 0 g | 3.50 μm |
| 0.1 g | 3.67 μm |
| 0.2 g | 4.15 μm |
| 0.3 g | 4.75 μm |
| 0.4 g | 5.61 μm |
| 0.5 g | 6.01 μm |

Figure 3:
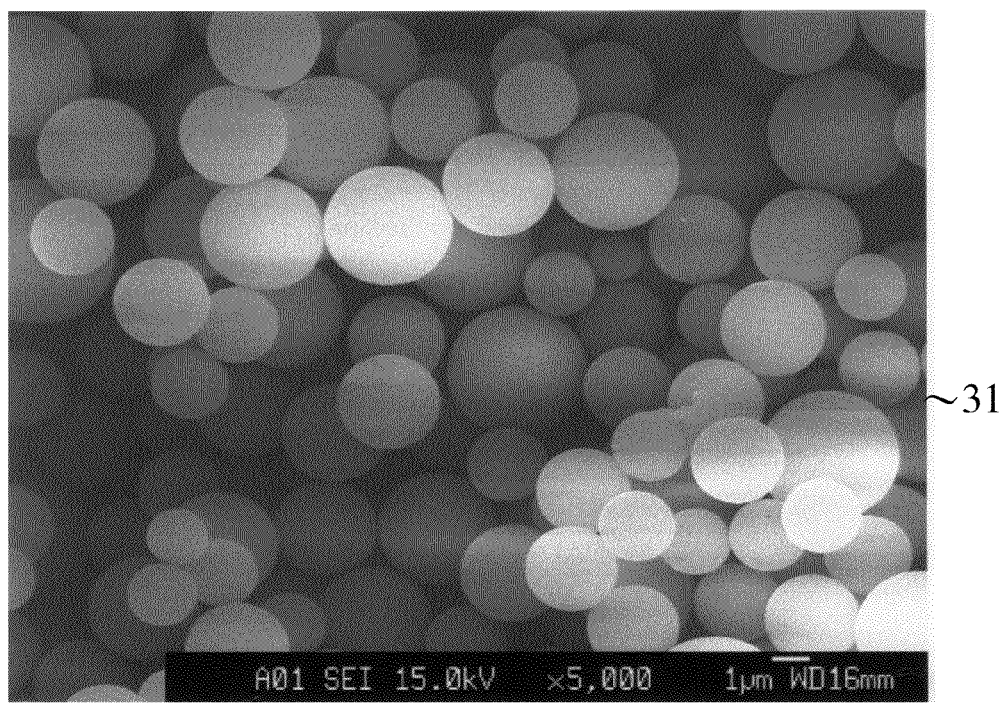
FIG. 3 is a photograph of absorbent made in the method in accordance with the present invention.

In this embodiment, after the microwave reaction, the shape of the resultant polymethylmethacrylate cross-linked acrylic acid is affirmed. The step of separating the solids from the liquid includes the step: subjecting the polymethylmethacrylate cross-linked acrylic acid solution to centrifugal washing; taking and drying one of the solutes of the polymethylmethacrylate cross-linked acrylic acid solution to obtain thepolymethylmethacrylate cross-linked acrylic acid microballs. The drying may be conducted at 50° C. to 90° C. for 2 to 24 hours, thus providing dried polymethylmethacrylate cross-linked acrylic acid micro-balls. Referring to FIG. 3, there is shown a scanning electron microscope ("SEM") photograph of poly(MMA-MTC-AA) micro-balls provided by the use of 0.1 gram of AA. The size of the polymethylmethacrylate nanometer micro-balls may be 3 to 7 micrometers.

Example 2

Polymethylmethacrylate cross-linked acrylic acid microballs made in a method for making absorbent for metal is used are used to absorb ions of metal. Poly(MMA-MTC-AA)

micro-balls that include carboxylic group on the surface are used to process solution that contains metal ions at the temperature to 95° C., thus reducing the metal ions into atoms and attached to the surfaces of the micro-balls. The metal ions that are absorbed may be ions of Au (III), Pd (II), Ag (I), Pt (II), Pt (IV), Cu (II) or In (II).

At first, polymethylmethacrylate ("PMMA") is used for absorbing metal. Conventional PMMA, PMMA-MTC (with MTC used as the dispersant) and Poly(MMA-MTC-AA) (with MTC used as the dispersant) are used to absorb palladium in comparison with polymethylmethacrylate conventionally made by using polyvinylpyrrolidone ("PVP") as the dispersant. Then, 10 ml of solution that contains poly(MMA-MTC-AA) micro-balls is added into solution that contains 500 ppm of palladium ions and stirred at the room temperature for 30 minutes. The color of the solution will be turned into black from white. The solution that has absorbed macromolecular micro-balls of the palladium is subjected to air-suction filtration, thus providing clear filtered liquid. ICP is used to measure the concentration of the palladium ions. As listed in Table 2, after the palladium ions are absorbed by the macromolecular micro-balls of PMMA, poly(PMMA-MTC) and poly(PMMA-MTC-AA), the concentration of the palladium ions left in the filtered liquid is 257 ppm, 66 to 75 ppm and lower than 6 ppm, respectively.

TABLE 2

| Sort of solution | Conditions | Average size (μm) | Concentration of palladium ions before the absorption (ppm) | Temperature of solution (° C.) | Concentration of palladium ions after the absorption (ppm) |
|---|---|---|---|---|---|
| Poly(MMA-AA-MTC) | MTC = 0.1 g AA = 0.1 g | 3.67 | 550 | Room temperature | 6 |
| Poly(MMA-AA-MTC) | MTC = 0.1 g AA = 0.2 g | 4.15 | | | <1 |
| Poly(MMA-MTC) | MTC = 0.1 g | 3.01 | | | 66 |
| Poly(MMA-MTC) | MTC = 0.1 g | 3.01 | | 55 | 75 |
| PMMA | PVP = 1 g | 1.67 | | Room temperature | 257 |

As listed in Table 2, poly(MMA-MTC-AA) macromolecular micro-balls exhibits the best absorptive effect. It is learned that AA is used in the microwave reaction to provide macromolecular micro-balls with carboxylic group on the surface for absorbing palladium. When the temperature of the carboxylic group is raised, the amount of the metal ions reduced and absorbed by the micro-balls is increased.

Conclusively, the polymethylmethacrylate cross-linked acrylic acid micro-balls made in the method in accordance with the present invention exhibit several advantages. At first, the micro-balls are made with similar sizes. Secondly, the micro-balls react with metal ions fast. Thirdly, the micro-balls are made in a simple process at a low cost. Fourthly, the micro-balls are highly selective. Fifthly, the micro-balls are highly absorptive.

The present invention has been described via the detailed illustration of the embodiments. Those skilled in the art can derive variations from the embodiments without departing from the scope of the present invention. Therefore, the embodiments shall not limit the scope of the present invention defined in the claims.

The invention claimed is:

1. A method for making an absorbent for metal including the steps of:
    providing a composition of a first monomer and a composition of a second monomer;
    wherein the composition of the first monomer includes the first monomer and a solvent;
    wherein the composition of the second monomer includes the second monomer, an initiator and a cationic dispersant;
    wherein the cationic dispersant is a mixture of a material selected from the group consisting of 2-(methacryloyloxy)methyl-trimethylammonium chloride, 2-(methacryloyloxy)ethyl-trimethylammonium chloride, and 3-methacryloxy-propyl-trimethoxysilane with a material selected from the group consisting of hydrochloric acid and sulfuric acid;
    introducing the composition of the second monomer in the composition of the first monomer; and
    executing a microwave reaction to provide micro-balls of the absorbent for metal.

2. The method for making the absorbent for metal in accordance with claim 1,
    wherein the first and the second monomers are selected from the group consisting of methylmethacrylate, phenylethene, vinyl acetate, acrylic acid, methacrylic acid, trifluoromethylacrylic acid, methylenesuccinic acid and vinylbenzoic acid.

3. The method for making the absorbent for metal in accordance with claim 2,
    wherein the first and the second monomers are made of a same compound.

4. The method for making the absorbent for metal in accordance with claim 2,
    wherein the first monomer is made of methylmethacrylate while the second monomer is made of acrylic acid.

5. The method for making the absorbent for metal in accordance with claim 1,
    wherein the solvent is a solution that contains a small amount of salt.

6. The method for making the absorbent for metal in accordance with claim 5,
    wherein the solution includes water and a material selected from the group consisting of NaCl and $NH_4Cl$.

7. The method for making the absorbent for metal in accordance with claim 6,
    wherein a weight concentration of salt in the water is 0.01% to 1%.

8. The method for making the absorbent for metal in accordance with claim 1,
    wherein the initiator is selected from the group consisting of azobisisobutyronitrile, lauroyl peroxide, ammonium persulfate and potassium persulphate.

9. The method for making the absorbent for metal in accordance with claim 1, wherein the microwave reaction is executed for 5 to 120 minutes, at 30 watts to 300 watts, at 60° C. to 85° C.

10. The method for making the absorbent for metal in accordance with claim 9,
wherein the step of executing the microwave reaction includes the step of providing a reactor with a cooling unit to ensure that microwave heating is executed in the entire period of the microwave reaction.

11. The method for making the absorbent for metal in accordance with claim 1, further including the steps of:
executing a centrifugal process on a solution of the step of executing the microwave reaction, thus providing micro-balls;
filtering the micro-balls;
washing the micro-balls; and
drying the micro-balls.

12. The method for making an absorbent for metal including the steps of:
providing a composition of a first monomer and a composition of a second monomer;
wherein the composition of the first monomer includes the first monomer and a solvent;
wherein the composition of the second monomer includes the second monomer, an initiator and a cationic dispersant;
wherein the cationic dispersant is a mixture of methacryloyloxyethyl trimethyl ammonium chloride with methacrylatoethyl trimethyl ammonium chloride;
introducing the composition of the second monomer in the composition of the first monomer; and
executing a microwave reaction to provide micro-balls of the absorbent for metal.

* * * * *